(12) United States Patent
Kawata

(10) Patent No.: US 7,835,547 B2
(45) Date of Patent: Nov. 16, 2010

(54) IMAGE RECOGNITION DEVICE, IMAGE RECOGNITION METHOD, AND PROGRAM FOR CAUSING COMPUTER TO EXECUTE THE METHOD

(75) Inventor: Kozo Kawata, Hyogo (JP)

(73) Assignee: Glory Ltd., Himeji-shi (JP)

( * ) Notice: Subject to any disclaimer, the term of this patent is extended or adjusted under 35 U.S.C. 154(b) by 983 days.

(21) Appl. No.: 11/628,619

(22) PCT Filed: May 25, 2005

(86) PCT No.: PCT/JP2005/009575

§ 371 (c)(1),
(2), (4) Date: Dec. 6, 2006

(87) PCT Pub. No.: WO2005/122093

PCT Pub. Date: Dec. 22, 2005

(65) Prior Publication Data
US 2008/0273761 A1    Nov. 6, 2008

(30) Foreign Application Priority Data
Jun. 7, 2004    (JP)    ............................. 2004-168945

(51) Int. Cl.
*G06K 9/00*    (2006.01)
(52) U.S. Cl. ...................................... 382/115; 382/118
(58) Field of Classification Search ......... 382/115–118, 382/181, 190, 209, 218
See application file for complete search history.

(56) References Cited

U.S. PATENT DOCUMENTS 7,120,278 B2 * 10/2006 Sukegawa et al. ........... 382/118

2002/0136433 A1 * 9/2002 Lin ............................. 382/118
2005/0117783 A1 * 6/2005 Sung et al. .................. 382/118
2008/0298645 A1 * 12/2008 Doi ............................. 382/118

FOREIGN PATENT DOCUMENTS

| JP | 4-112391 A | 4/1992 |
|---|---|---|
| JP | 2004-118731 A | 4/2004 |

OTHER PUBLICATIONS

Computer English translation of Japanese patent No. 2004-118731, pp. 1-26.*
Computer English translation of Japanese patent No. 2004-118627, pp. 1-14.*
L. Wiskott et al., "Face Recognition by Elastic Bunch Graph Matching," IEEE Transactions on Pattern Analysis and Machine Intelligence, vol. 19, No. 7, Jul. 1997, pp. 775-779.

* cited by examiner

*Primary Examiner*—Daniel G Mariam
(74) *Attorney, Agent, or Firm*—Foley & Lardner LLP

(57) ABSTRACT

An average face-image is created from images belonging to a face-image group and sample points are specified on the average face-image. Sample points are detected on images in the face-image group corresponding to sample points on the average face-image thereby creating recognition subspaces of feature vectors. Sample points are detected on registered images and an input image corresponding to the sample points on the average face-image by using the recognition subspaces. A degree of similarity between the feature vectors in the recognition subspaces of the registered images and the input image is calculated at the detected sample points. Finally, a person is verified based on the degree of similarity.

8 Claims, 14 Drawing Sheets

(RECOGNITION SUBSPACE)
=(FLUCTUATION SUBSPACE OF OTHER PERSON)∩
 (FLUCTUATION SUBSPACE OF PERSON)C

IMAGE RECOGNITION DEVICE, IMAGE RECOGNITION METHOD, AND PROGRAM FOR CAUSING COMPUTER TO EXECUTE THE METHOD

TECHNICAL FIELD

The present invention relates generally to an image recognition apparatus, an image recognition method, and a computer program that verify images to identify a person by comparing local features of sample points between an input image capturing predetermined body parts such as a face or a palm print of the person and a plurality of registered images of the person and other persons relating to the parts, and more particularly, to an image recognition apparatus, an image recognition method, and a computer program that efficiently sets sample points for comparing image features and that can conduct an identification process of person in a short time.

BACKGROUND ART

Although a technology is conventionally used to identify a person from other persons by utilizing physical features of an individual in a security system of entry management, access to computer, etc., in a method that takes a picture of a face, a palm print, etc., with a CCD (Charge Coupled Device) camera, etc., to make an input image and that verifies the input image and registered images of faces, palm prints, etc., registered in advance to identify a person, high identification capability cannot be realized just by overlaying the input image and a plurality of registered images to compare degree of correspondence since facial expressions, how much the palm is opened, shooting angles, etc., are different.

An Eigenface method is generally known as an image recognition method that checks whether there is a match between an input image and registered images to identify a person. The Eigenface method normalizes sizes of the images in an image group to generate subspaces of feature vectors consisting of gray values of pixels of the normalized images by principal component analysis and projects the feature vectors of the input image and the registered images over to the subspaces and calculates a degree of similarity to conduct verification and determination.

The conventional technology has a problem of deteriorating the capability of distinguishing a person from other persons when distortion, deviation, etc., of an input face-image occurs, from the registered face images, due to differences in facial expressions, shooting angles, etc., because the verification of the input face-image and the registered face images is conducted based on fixed pixels between the input image and the registered images.

Another technology is disclosed (see, e.g., non-patent document 1) that sets sample points to parts that are features of faces such as eyes, noses, mouths, etc., of registered images of faces. The technology finds positions of sample points on the input image corresponding to the sample points on the registered images by calculating the degree of similarity of both images and compares local features of both images at the sample points found.

This conventional technology alleviates the problem and can enhance the capability of distinguishing a person from other persons since the technology can detect sample points on an input image corresponding to the sample points on the registered images by calculating the degree of similarity even when distortion or deviation between registered images and the input image occurs due to differences in facial expressions, shooting angles, etc.

Non-patent document 1: L. Wiskott and three others, "Face Recognition by Elastic Bunch Graph Matching", IEEE Transactions On Pattern Analysis And Machine Intelligence, vol. 19, no. 7, pp. 775-779, 1997.

DISCLOSURE OF INVENTION

Problem to be Solved by the Invention

However, in the conventional technology (see, e.g., non-patent document), comparison of the input image and the registered images is performed with respect to corresponding sample points. Therefore, there are problems that work load increases because sample points have to be set in advance for all the registered images, and the work load further increases with an increase in the number of registered images. Moreover, because the sample points are stored on a memory, capacity of the memory must be increased with an increase in the number of sample points.

A need therefore exists to automatically set the sample points with some kind of method when conducting an image verification process instead of setting the sample points on the registered images in advance and detecting the sample points on the input image based on the sample points on registered images. However, when conducting 1:N matching that verifies one input image and a multiplicity of registered images, the verification process takes a long time, causing a practical problem if efficient setting process of sample points is not conducted.

The present invention has been conceived to solve the problems of the conventional technologies, and the object of the present invention is to provide an image recognition apparatus, an image recognition method, and a computer program that efficiently set sample points for comparing features of images, allowing to conduct an identification process of person in a short time.

Means for Solving Problem

To solve the above problems and to achieve the above objects, an image recognition apparatus that verifies images to identify a person by comparing local features at sample points between an input image capturing a predetermined body part of the person and a plurality of registered images of other persons includes an average image creating unit that creates an average image from a plurality of images in an image group related to the part; a subspace creating unit that detects sample points on the images in the image group corresponding to sample points set on the average image to create subspaces of feature vectors at the sample points; an image sample point detecting unit that detects sample points of the input image and registered images based on the subspaces; and a verification determination unit that calculates a degree of similarity between feature vectors at the sample points on the input image and feature vectors at the sample points on the registered images and that verifies the input image and the registered images to identify the person.

The image recognition apparatus according to claim 2, in the image recognition apparatus according to claim 1, the image sample point detecting unit detects the sample points on the input image and the registered images corresponding to the sample points on the average image based on distance from the feature vector of the input image to the subspace and distances from the feature vectors of the registered images to the subspaces respectively.

The image recognition apparatus according to claim 3, in the image recognition apparatus according to claims 1 or 2, the subspace creating unit comprises a first detecting unit that detects sample points on images in the image group corresponding to the sample points set on the average image using correlations between the feature vectors of the images in the image group and the feature vector of the average image; a provisional subspace creating unit that creates provisional subspaces of feature vectors using the feature vectors at the sample points on the images in the image group detected by the first detecting unit; a second detecting unit that detects sample points on images in the image group corresponding to the sample, points set on the average image based on the distances from the feature vectors of the images in the image group to the subspaces; and a subspace modifying unit that modifies the subspaces created by the provisional subspace creating unit using the feature vectors at the sample points on the images in the image group detected by the second detecting unit.

The image recognition apparatus according to claim 4, in the image recognition apparatus according to claim 3, the provisional subspace creating unit comprises a first difference subspace of person calculating unit that prepares an image pair of the person from the image group to calculate difference subspaces of person by finding differences between feature vectors at the sample points of the image pair detected by the first detecting unit corresponding to the sample points set on the average image; a first difference subspace of other person calculating unit that prepares an image pair of other person from the image group to calculate difference spaces of other person by finding differences between the feature vectors at the sample points of the image pair detected by the first detecting unit corresponding to the sample points set on the average image; and a first recognition subspace creating unit that calculates intersections of auxiliary spaces of the difference subspaces of person and the difference subspaces of other person and that regards the intersections as subspaces.

The image recognition apparatus according to claim 5, in the image recognition apparatus according to claim 3, the subspace modifying unit comprises a second difference subspace of person calculating unit that prepares an image pair of person from the image group to calculate difference subspaces of person by finding differences between feature vectors at the sample points of the image pair detected by the second detecting unit corresponding to the sample points set on the average image; a second difference subspace of other person calculating unit that prepares an image pair of other person from the image group to calculate difference spaces of other person by finding differences between the feature vectors at the sample points of the image pair detected by the second detecting unit corresponding to the sample points set on the average image; a second recognition subspace creating unit that calculates intersections of auxiliary spaces of the difference subspaces of person and the difference subspaces of other person and that regards the intersections as subspaces; and a recognition subspace updating unit that updates the subspaces by repeatedly using the second detecting unit, the second difference subspace of person calculating unit, the second difference subspace of other person calculating unit, and the second recognition subspace creating unit until the subspaces created by the second recognition subspace creating unit converge.

The image recognition apparatus according to claim 6, in the image recognition apparatus according to claims 1 or 2, the verification determination unit calculates a degree of similarity based on the correlations in the subspaces of the feature vectors at the sample points corresponding to the registered images and the input image and verifies the input image and the registered images to identify the person.

The image recognition apparatus according to claim 7, in the image recognition apparatus according to claims 1 or 2, the verification determination unit extracts registered images similar to the input image based on the feature vectors generated by transforming elements of the feature vectors at the sample points on the input image and the sample points on the registered images to approximate values and calculates a degree of similarity based on the correlations in the subspaces of the feature vectors made of the elements before transformation at the sample points corresponding to the extracted registered images and the input image to verify the input image and the registered images and to identify the person.

According to claim 8, an image recognition method that verifies images to identify a person by comparing local features at the sample points between an input image capturing a predetermined body part of the person and a plurality of registered images of the person and other persons relating to the part, the image recognition method includes, an average image creating step of creating an average image from a plurality of images in an image group relating to the part; a subspace creating step of detecting sample points on the images in the image group corresponding to the sample points set on the average image to create subspaces of the feature vectors of the sample points; an image sample point detecting step of detecting sample points of the input image and the registered images based on the subspaces; and a verification determination step of calculating a degree of similarity between the feature vectors at the sample points on the input image and the feature vectors at the sample points on the registered images and of verifying the input image and the registered images to identify the person.

According to an embodiment of the invention, a computer program causing a computer to execute the image recognition method that verifies images to identify a person by comparing local features at the sample points between an input image capturing a predetermined body part of the person and a plurality of registered images of the person and other persons relating to the part, the computer program causing the computer to execute an average image creating step of creating an average image from a plurality of images in an image group relating to the part; a subspace creating step of detecting sample points on the images in the image group corresponding to the sample points set on the average image to create subspaces of the feature vectors of the sample points; an image sample point detecting step of detecting sample points of the input image and the registered images based on the subspaces; and a verification determination step of calculating a degree of similarity between the feature vectors at the sample points on the input image and the feature vectors at the sample points on the registered images and of verifying the input image and the registered images to identify the person.

Effect of the Invention

The invention of claim 1 creates an average image from the plurality of image groups related to body parts, detects sample points on the images of the plurality of image groups corresponding to the sample points set on the average image, creates subspaces of feature vectors at the sample points, detects sample points of the input image and the registered images based on the created subspaces, calculates the degree of similarity between the feature vectors at the sample points on the input image and the feature vectors at the sample points on the registered images, and identifies a person by verifying the input image and the registered images, thereby accomplishing a successful outcome of obtaining an image processing apparatus capable of efficiently setting sample points for comparing image features and capable of conducting the identification process of person in a short time.

The invention of claim 2 detects sample points on the input image and the registered images corresponding to the sample points on the average image based on the distances from the feature vectors of the input image to the subspaces and the distances from the feature vectors of the registered images to the subspaces respectively, thereby accomplishing a successful outcome of obtaining an image processing apparatus capable of efficiently detecting sample points on the input image and the plurality of registered images and capable of performing high-speed identification process of person even when conducting the 1:N matching.

The invention of claim 3 detects sample points on images in the image group corresponding to the sample points set on the average image by using correlations between the feature vectors of the images in the image group and the feature vectors of the average image, creates a provisional subspace of the feature vectors by using the feature vectors of the detected sample points on the images in the image group, detects samples points on the images in the image group corresponding to the sample points set on the average image based on the distances from the feature vectors of the images in the image group to the subspaces, and modifies the subspaces of the feature vectors using the feature vectors of the detected sample points on the images in the image group, thereby, when creating subspaces of the feature vectors, accomplishing a successful outcome of obtaining an image recognition apparatus capable of efficiently detecting sample points on images in the image group corresponding to the sample points on the average image to create the subspaces.

The invention of claim 4 prepares an image pair of the person from the image group, finds differences between feature vectors at the sample points of the image pair corresponding to the sample points set on the average image to calculate the difference subspaces of person, prepares an image pair of other person from the image group, finds differences between feature vectors at the sample points of the image pair corresponding to the sample point set on the average image to calculate the difference subspaces of other person, and then calculates as subspaces intersections between the auxiliary spaces of the calculated difference subspaces of person and difference subspaces of other person, thereby accomplishing a successful outcome of obtaining an image recognition apparatus resistant to noise of fluctuations in the image of person caused by differences in facial expressions, how much the palm is opened, shooting angles, etc., because the fluctuations of the person image are eliminated, as well as enabling efficient extraction of knowledge to the subspaces since the fluctuations of the person and other person are emphasized and enhances the capability to distinguish the image of person from the images of other person.

The invention of claim 5 prepares an image pair of the person from the image group, finds differences between the feature vectors at the sample points of the image pair corresponding to the sample points set on the average image to calculate the difference subspaces of person, prepares an image pair of other person from the image group, finds differences between the feature vectors at the sample points of the image pair corresponding to the sample points set on the average image to calculate the difference subspaces of other person, calculates as subspaces the intersections of the auxiliary spaces of the calculated difference subspaces of person and difference subspaces of other person, and updates the subspaces by repeating the process of detecting the sample points on the images in the image group and repeats the process of creating the subspaces until the created subspaces converge, thereby accomplishing a successful outcome of obtaining an image recognition apparatus capable of creating subspaces extracting features of the image group more accurately than the created provisional subspace and capable of enhancing the identification capability when distinguishing the image of the person from the image of other person using the subspace.

The invention of claim 6 calculates the degree of similarity based on the correlations in the subspaces of the feature vectors among the sample points corresponding to the detected registered images and input image and verifies the input image and the registered images to identify the person, thereby accomplishing a successful outcome of obtaining an image recognition apparatus capable of conducting accurate and efficient verification and determination even when differences exist in expressions, how much the palm is opened, shooting angles, etc., among images.

The invention of claim 7 extracts registered images similar to the input image based on the feature vectors generated by converting the elements of the featured vectors of the sample points on the input image and the elements of the feature vectors at the sample points on the registered images to approximate values, then calculates the degree of similarity based on the correlations in the subspaces of the feature vectors made of the elements before the conversion of the sample points corresponding to the extracted registered images and input image, and verifies the input image and the registered images to identify the person, thereby accomplishing a successful outcome of obtaining an image processing apparatus capable of conducting accurate and high-speed identification process of person by narrowing down the registered images for verification with the input image and by conducting thorough verification process between the narrowed down registered images and the input image.

The invention of claim 8 creates an average image from the plurality of groups related to body parts, detects the sample points on the images in the image group corresponding to the sample points set on the average image, creates subspaces of the feature vectors at the sample points, detects sample points of the input image and the registered images based on the created subspaces, calculates the degree of similarity between the feature vector sat the sample points on the input image and the feature vectors at the sample points on the registered images, and verifies the input image and the registered images to identify the person, thereby accomplishing a successful outcome of obtaining an image processing method capable of efficiently setting the sample points for comparing the features of the images to conduct the identification process of person.

An embodiment of the invention creates an average image from the plurality of image groups related to body parts, detects sample points on the images in the image group corresponding to the sample points set on the average image, creates subspaces of the feature vectors at the sample points, detects the sample points of the input image and the registered images based on the created subspaces, calculates the degree of similarity between the feature vectors at the sample points on the input image and the feature vectors at the sample points on the registered images, and verifies the input image and the registered images to conduct identification of the person, thereby accomplishing a successful outcome of obtaining a program causing a computer to execute the image recognition method capable of efficiently setting the sample points for comparing the features of the images to conduct the identification process of person.

Figure 1:
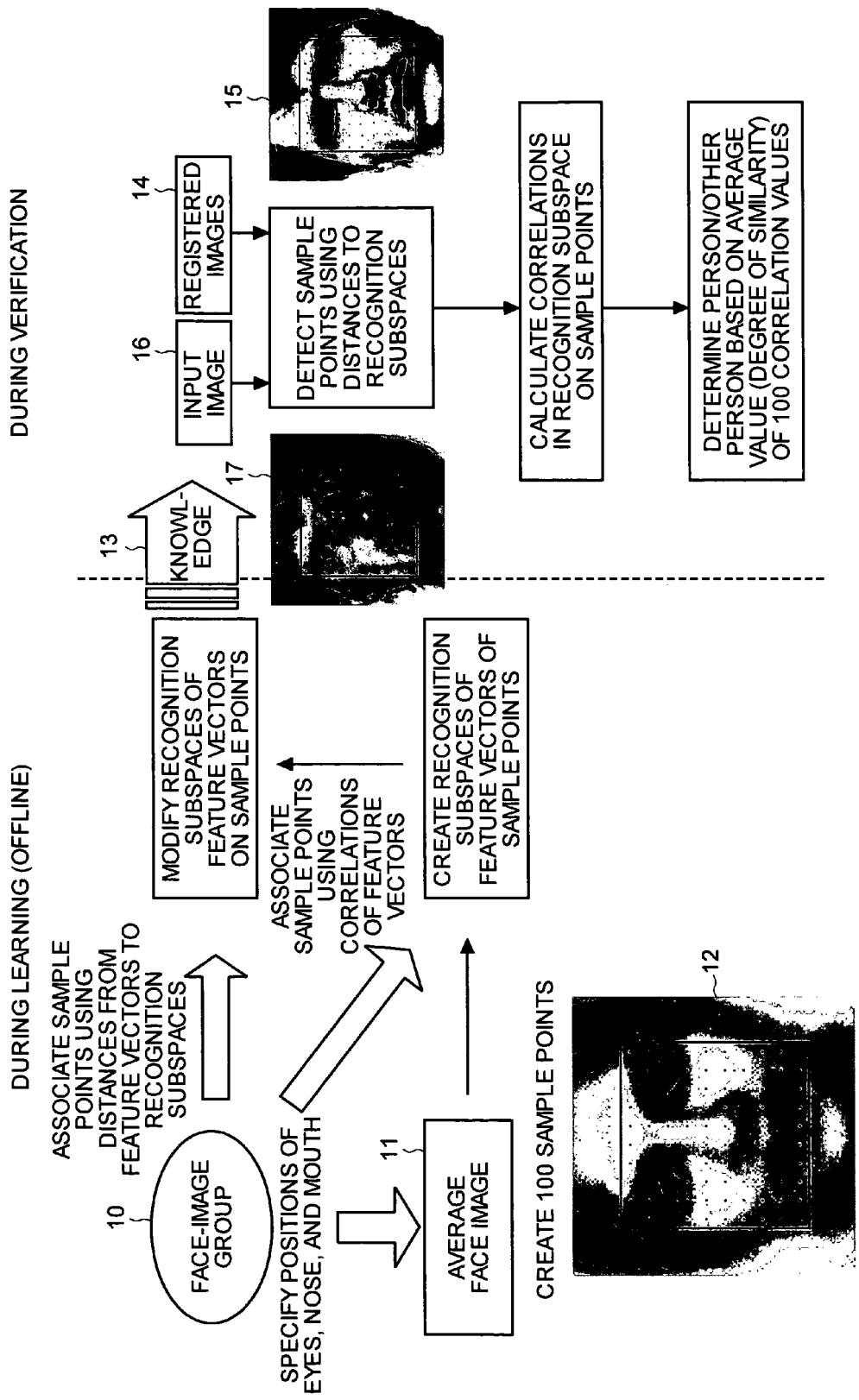
FIG. 1 is an explanatory view of a concept of an image recognition process according to a first embodiment.

EXPLANATIONS OF LETTERS OR NUMERALS 10 face-image group
11 average face-image
12 example of average face-image with 100 specified sample points
13 knowledge
14 registered image
15 example of registered image with detected sample points
16 input image
17 example of input image with detected sample points
20 feature vector space
21 fluctuation subspace of other person
22 fluctuation subspace of person
23 intended recognition subspace
30 feature vector of face image
31 distance from feature vector to recognition subspace
40 projection of feature vector of input image to recognition space
41 projection of feature vector of registered image to recognition space
50 face-image recognition apparatus
51 face-image input accepting unit
52 normalization processing unit
53 face-image learning unit
54 registered-image storage unit
55 registered-image sample-point detecting unit
56 input-image sample-point detecting unit
57 degree-of-similarity calculating unit
58 verification determination unit
61 image input unit
62 image memory
63, 64 interface
65 calculation controlling unit (CPU)
66 main storage unit (ROM, RAM)
67 auxiliary storage unit
68 input device
69 display device

BEST MODE(S) FOR CARRYING OUT THE INVENTION

Exemplary embodiments of an image recognition apparatus, an image recognition method, and a computer program of the present invention will now be described in detail with reference to the accompanying drawings. A case of face image recognition using a face image will be described here.

First Embodiment

A concept of the image recognition apparatus of a first embodiment will first be described. FIG. 1 is an explanatory view for explaining a concept of an image recognition process according to the first embodiment. As shown in FIG. 1, a face image recognition process of the first embodiment consists of two processes: a process that is performed during offline learning and a process that is performed during verification, and is configured to conduct verification process using knowledge 13 of face image features learned in the process during learning.

A procedure of the process during offline learning will now be described. Positions of eyes, noses, and mouths are first specified on the images in a face-image group 10. However, at least the eyes need to be specified here. The images are then normalized so that the eyes, noses, and mouths of the images in the face-image group 10 overlap, and gray values of the pixels of the images in the face-image group 10 are averaged to create an average face-image 11.

The "face-image group" can be a group of images of predetermined body parts of a plurality of persons, or, can be a plurality of different images of a body part of a single person that are different depending on facial expressions, how much the palm is opened, shooting angles, etc. The face-image group need not be the same as a group of registered images.

An arbitrary number of sample points are then specified on the created average face-image 11. An example 12 of an average face-image with 100 specified sample points on the average face-image 11 is illustrated in FIG. 1. Sample points on the images in the face-image group 10 corresponding to the sample points of the average face-image 11 are detected using correlations between feature vectors of the average face-image 11 and feature vectors of the images in the face-image group 10. Subspaces of the feature vectors of the images in the face-image group 10 are then created on the detected sample points using a method of principal component analysis. The subspaces are provisional and will be modified later.

The "feature vector" is a group of amount of features such as a gray value of pixels or a change rate of the gray value at local areas around the sample points represented as a vector consisted of real number elements. The feature vector can easily be created from a digital face image consisted of a group of a plurality of pixels having amounts of features.

Figure 2:
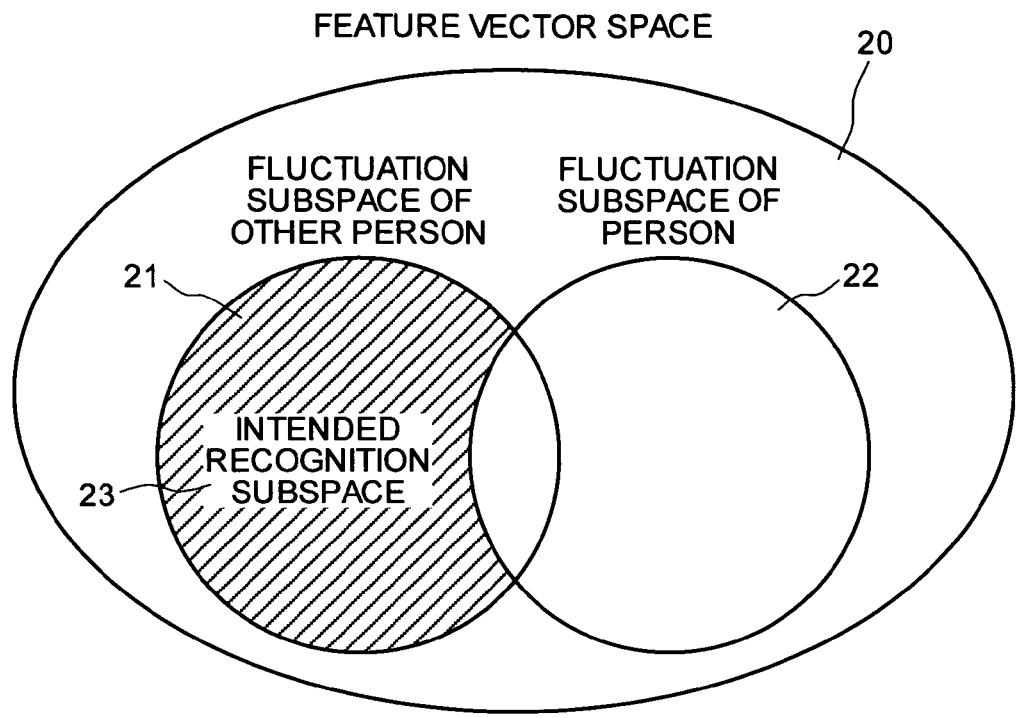
FIG. 2 is an explanatory view of a concept of a subspace according to the first embodiment.

A concept of the subspace used in the embodiment will then be described. FIG. 2 is an explanatory view for explaining a concept of the subspace in the first embodiment. In a feature vector space 20, a fluctuation subspace of person 22 is configured by differences in a plurality of feature vectors of image pairs of the person that are different due to differences in facial expressions, shooting angles, etc. A fluctuation subspace of other person 21 is configured by differences in feature vectors of image pairs of person and other person. An intended subspace 23 can be obtained from an intersection of an auxiliary space of the fluctuation subspace of person 22 and the fluctuation subspace of other person 21. A subspace configured this way will hereinafter be called "recognition space".

Returning to the description of FIG. 1, the provisional recognition subspaces 23 of feature vectors created using the images in the face-image group 10 are modified based on the distances from the feature vectors of the images in the face-image group 10 to the recognition subspaces 23.

Specifically, the distances from the feature vectors of the images in the face-image group 10 to the recognition subspaces 23 are calculated and sample points on the images are detected such that the distances become shorter. After the sample points are detected, new recognition subspaces 23 are created based on the feature vectors of the images of the sample points. Until the created recognition subspaces 23 are converged, a sample point detecting process based on the distances from the feature vectors to the recognition subspaces 23 and a subspace creating process based on the feature vectors at the sample points of the images in the face-image group 10 are repeated to modify the recognition subspaces 23. The obtained recognition spaces 23 are used as knowledge 13 during image verification that has learned features of the face image.

Figure 3:
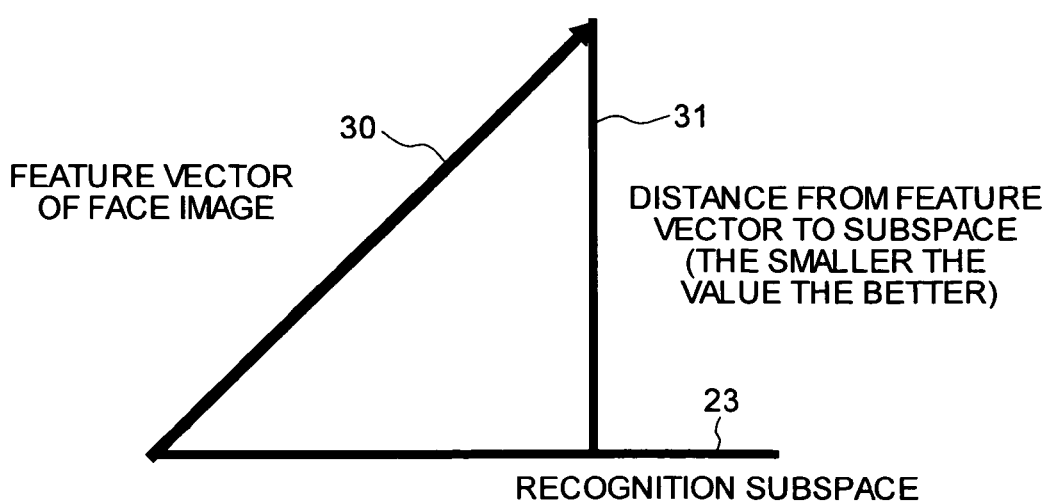
FIG. 3 is an explanatory view of a concept of sample point detection on a face image by using a distance from a feature vector to a recognition subspace according to the first embodiment.

A concept of detection of sample points of the images using the distance from the feature vector to the recognition subspace 23 used in the embodiment will then be described. FIG. 3 is an explanatory view for explaining a concept of sample point detection on a face image using the distance from the feature vector to the recognition subspace according to the first embodiment.

In FIG. 3, the shorter the distance 31 from feature vector 30 of a face image to the recognition subspace 23, the better illustrated the features corresponding to the features of the face extracted to the recognition subspace 23 on the face image. In other words, choosing the sample points that make the distance short enables setting of the sample points on the image corresponding to the sample points on the average face-image 11.

Returning to the description of FIG. 1, a procedure of the process during verification will be described. The distances from the feature vectors of the registered images 14 to the recognition subspaces 23 are first calculated and the sample points on the registered images 14 making the distances short are detected. An example 15 of the registered image 14 with sample points detected on the registered image 14 is illustrated in FIG. 1.

Methods for selecting a registered image 14 from a plurality of groups of the registered images 14 to verify the input image 16 includes a method that selects registered images 14 one after the other from the plurality of the registered images 14 and a method that selects an image by specifying registered images 14 associated with an ID inputted by the person, etc.

The "registered image" indicates a digital face image made of a group of a plurality of pixels each having a gray value and feature vector information consisted of feature vectors created in a local area around the plurality of pixels of the digital face image. However, the process during verification of a face image can be conducted if the registered image 14 at least includes the feature vectors.

As for the input image 16, similar in the case of the registered image 14, the distances from the feature vectors of the input image 16 to the recognition subspaces 23 are calculated and sample points on the input image 16 are detected such that the distances become short. An example 17 of the input image 16 with sample points detected on the input image 16 is illustrated in FIG. 1.

After detections of the sample points on the registered image 14 and the input image 16, a correlation value of feature vectors is calculated in the recognition subspace 23 by using the feature vectors of the registered image 14 and the input image 16 projected to the recognition subspace 23 at the sample points. This process is conducted to the entire sample points. An average value of the correlation values of the image pair of the input image 16 and the registered image 14 is calculated and the average value is regarded as a degree of similarity. In the example 12 of FIG. 1 with 100 sample points set on the average face-image 11, an average value (degree of similarity) of 100 correlation values is calculated. Identification of the person and other persons is conducted based on the degree of similarity.

Figure 4:
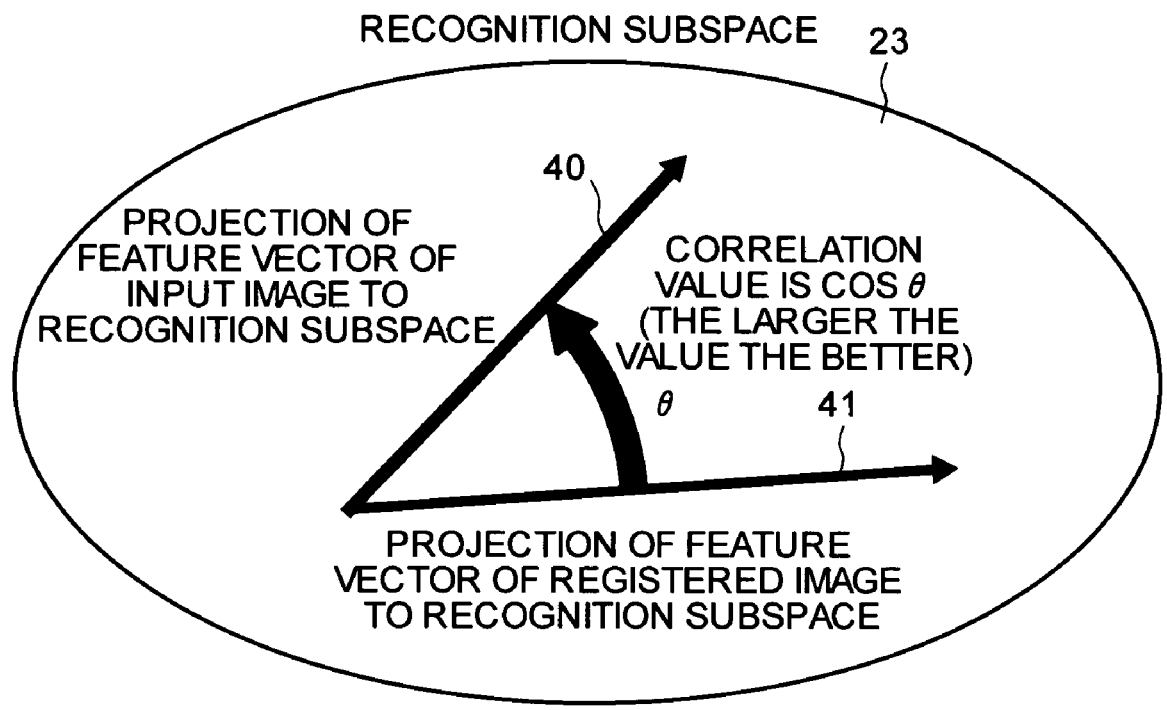
FIG. 4 is an explanatory view of a concept of a correlation value calculating process of feature vectors on a registered image and an input image according to the first embodiment.

FIG. 4 is an explanatory view for explaining a concept of a correlation value calculating process of the feature vector of the registered image 14 and the input image 16 according to the first embodiment. As shown in FIG. 4, the feature vector of the input image 16 and the feature vector of the registered image 14 are projected to the recognition subspace 23 and a correlation value of a feature vector 40 of the projected input image and a feature vector 41 of the projected registered image is calculated by cosine of an angle $\theta$, i.e., $\cos \theta$, formed by the projected feature vectors. The larger the correlation value is, the more similar the features of both images at the sample points are.

Figure 5:
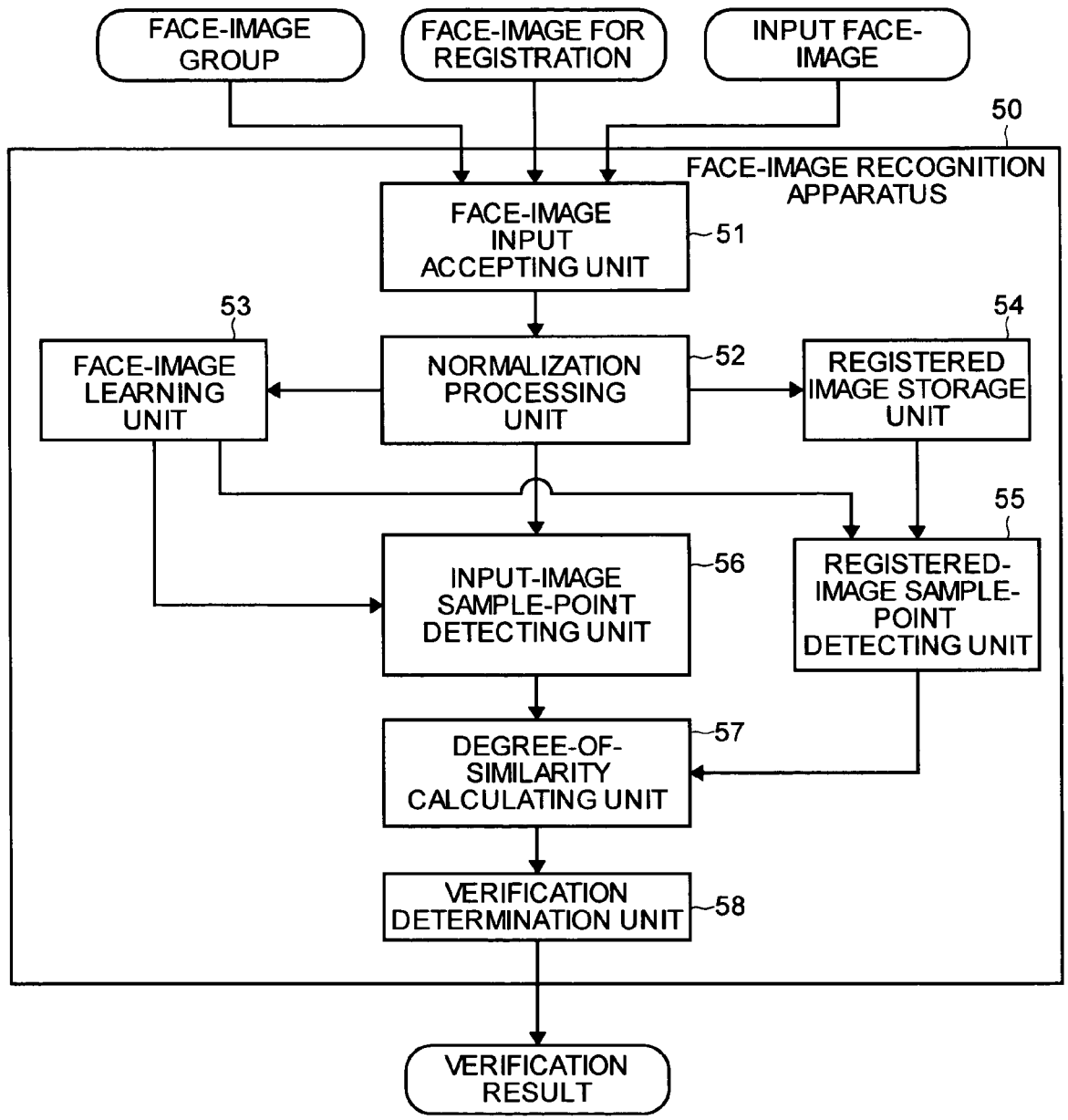
FIG. 5 is a functional block diagram of a configuration of a face-image recognition apparatus according to the first embodiment.

A configuration of a face-image recognition apparatus of the embodiment will then be described. FIG. 5 is a functional block diagram of a configuration of a face-image recognition apparatus of the first embodiment.

As shown in FIG. 5, a face-image recognition apparatus 50 of the embodiment includes a face-image input accepting unit 51, a normalization processing unit 52, a face-image learning unit 53, a registered-image storage unit 54, a registered-image sample-point detecting unit 55, an input-image sample-point detecting unit 56, a degree-of-similarity calculating unit 57, a verification determination unit 58.

The face-image input accepting unit 51 is an accepting unit that fetches a face-image group for learning, an input face-image, and a face-image for registration into the apparatus. The face-image input accepting unit 51 outputs the accepted images to the normalization processing unit 52.

The normalization processing unit 52 acquires images from the face-image input accepting unit 51 and conducts normalization process to the images to modify sizes of the faces of the images. The normalization processing unit 52 then outputs the normalized images to the face-image learning unit 53 when the accepted images are images of the face-image group, to the registered-image storage unit 54 when the accepted images are face-images for registration, and to the input-image sample-point detecting unit 56 when the accepted images are input face-images.

The face-image learning unit 53 acquires the normalized face-image group from the normalization processing unit 52 and creates an average face-image 11 using the face-image group 10. The face-image learning unit 53 then creates a recognition subspace 23 of the feature vector using the average face-image 11.

When the face-image for registration is accepted by the face-image input accepting unit 51, the registered-image storage unit 54 acquires and stores the image for registration 14 normalized by the normalization processing unit 52.

When the verification and determination between the registered image 14 and the input image 16 is conducted, the registered-image sample-point detecting unit 55 reads the recognition space 23 from the face-image learning unit 53 and the registered image 14 from the registered-image storage unit 54 to detect sample points on the registered image 14 using the distance from the feature vector of the registered image 14 to the recognition subspace 23.

When the verification and determination between the registered image 14 and the input image 16 is conducted, the input-image sample-point detecting unit 56 reads the recognition subspace 23 from the face-image learning unit 53 and the input image 16 from the normalization processing unit 52 to detect sample points on the input image 16 using the distance from the feature vector of the input image 16 to the recognition subspace 23.

The degree-of-similarity calculating unit 57 reads sample point information of the registered image 14 and the input image 16 and feature vector information of the registered image 14 and the input image 16 at the sample points. The degree-of-similarity calculating unit 57 then calculates the degree of similarity between the registered image 14 and the input image 16.

The verification determination unit 58 reads the degree of similarity of the registered image 14 and the input image 16 obtained by the degree-of-similarity calculating unit 57. The verification determination unit 58 then conducts verification determination of the registered image 14 and the input image 16 based on the degree of similarity and outputs verification result.

Figure 6:
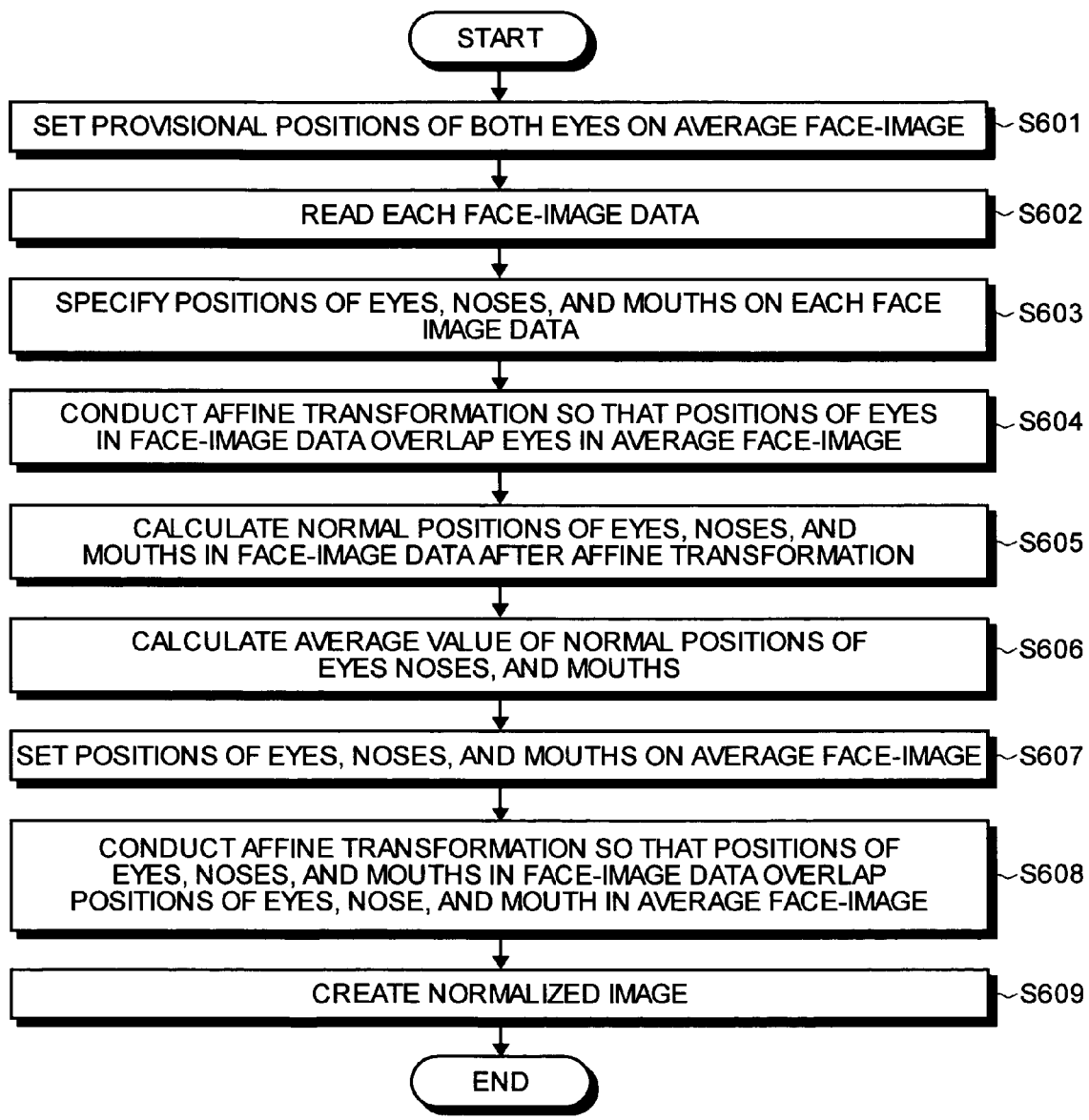
FIG. 6 is a flowchart of a normalization process that normalizes face-image data according to the first embodiment.

The image recognition process of the embodiment of FIG. 1 will now be described more specifically. FIG. 6 is a flowchart of a normalization process that normalizes face-image data according to the first embodiment. The normalization processing unit 52 conducts this process. A case of the images that the face-image input accepting unit 51 received are images in a face-image group for learning will be indicated here.

The normalization processing unit 52 provisionally prepares the average face-image 11 and provisionally sets positions of both eyes on the average face-image 11 (step S601). The normalization processing unit 52 then reads each face-image data in the face-image group 10 through the face-image input accepting unit 51 (step S602) and specifies positions of eyes, noses, and mouths on each of the read face-image data (step S603). However, at least positions of both eyes need to be specified here.

After specifying the positions of eyes, noses, and mouths, the normalization processing unit 52 conducts affine transformation so that the positions of the eyes of the face-image data overlap the positions of the eyes of the average face-image 11 (step S604) and calculates normal positions of the eyes, noses, and mouths in the face-image data after affine transformation (step S605). The normalization processing unit 52 then calculates an average value of the calculated normal positions of the eyes, noses, and mouths (step S606) and sets the positions of the eyes, nose, and mouth of the average face-image 11 (step S607).

After setting the positions of eyes, nose, and mouth on the average face-image 11, the normalization processing unit 52 conducts affine transformation so that the positions of eyes, noses, and mouths of the face-image data overlap the positions of the eyes, nose, mouth of the average face-image 11 (step S608) and creates normalized images of the face images in the image group 10 (step S609).

Although a case that the images received by the face-image input accepting unit 51 are images in the face-image group 10 for learning has been explained here, if the process during learning has ended and the received images are input face-images or face-images for registration, the positions of the eyes, nose, and mouth of the average face-image 11 have been already set during learning. Therefore, only the following process needs to be conducted. That is, the normalization processing unit 52 reads each of the face-image data (step S602), specifies the positions of eyes, noses, and mouths on each of the read face-image data (step S603), conducts affine transformation so that the positions of eyes, noses, and mouths in the face-image data overlap the positions of the eyes, nose, and mouth of the average face-image 11 (step S608), and creates normalized images of the read images (step S609).

Figure 7:
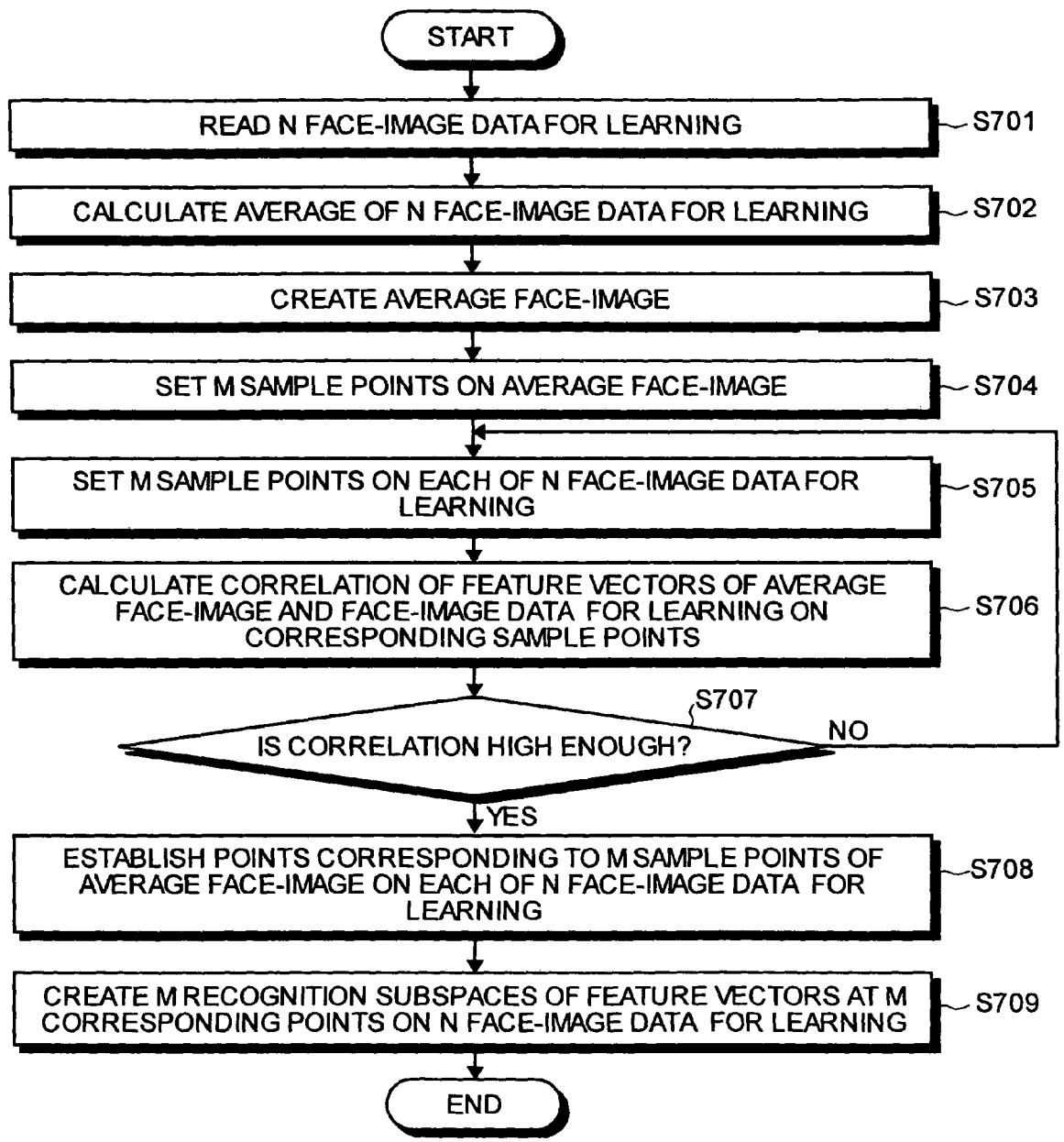
FIG. 7 is a flowchart of a recognition subspace creating process that creates recognition subspaces of feature vectors from a face-image group according to the first embodiment.

A process of creating recognition subspaces 23 from the feature vectors of the face-image group 10 at the face-image learning unit 53 will then be described. FIG. 7 is a flowchart of a recognition subspace creating process that creates recognition subspaces 23 of the feature vectors from the face-image group 10 according to the first embodiment.

The face-image learning unit 53 first reads N face-image data, where N is a positive integer, from the face-image group 10 for learning (step S701). The face-image learning unit 53 calculates an average of the gray values of pixels corresponding to the read N face-image data (step S702) and creates an average face-image 11 (step S703). The face-image learning unit 53 then sets M sample points on the created average face-image 11 (step S704).

The face-image learning unit 53 also sets M sample points, where M is a positive integer, corresponding to the sample points on the average face-image 11 on each of the N face-image data in the face-image groups 10 (step S705) and calculates the correlations between the average face-image 11 and the feature vectors of the face-image data on the corresponding M sample points (step S706).

The face-image learning unit 53 then decides whether the correlations between the feature vectors are higher than a certain threshold (step S707) and establishes sample points corresponding to the M sample points of the average face-image 11 on the N face-image data when the correlation is higher than the threshold (step S708), and resets M sample points on the N face-image data when the correlation is not higher than the threshold (step S705). The face-image learning unit 53 repeats the processes (steps S705 to S707) until the sample points have correlations higher than the threshold.

After setting the sample points corresponding to the M sample points of the average face-image 11 on each of the N face-image data (step S708), the face-image learning unit 53 creates M recognition subspaces 23 of the feature vectors of the M sample points on the N face-image data (step S709).

Figure 8:
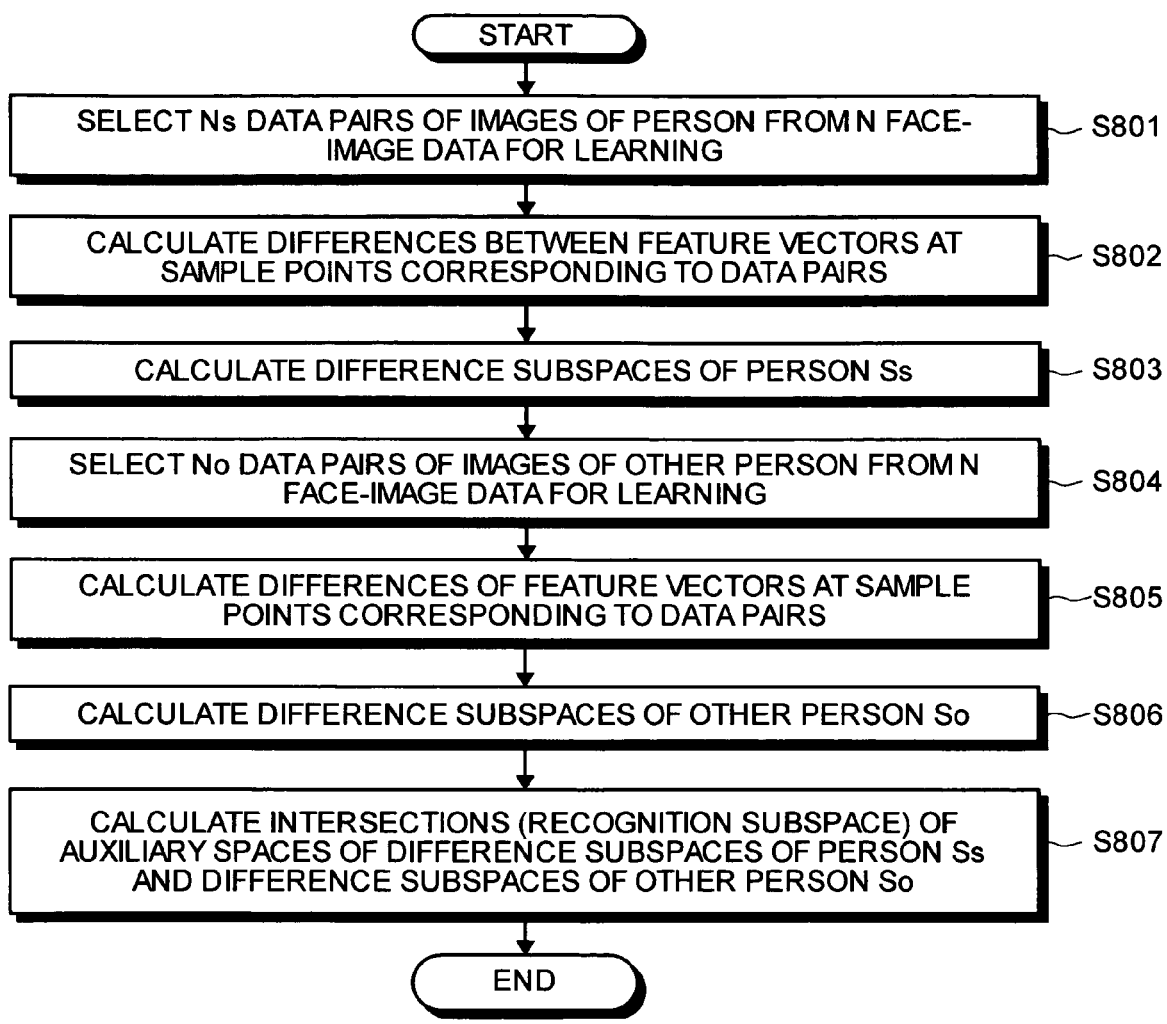
FIG. 8 is a flowchart of a recognition subspace creating process that creates recognition subspaces at sample points according to the first embodiment.

A specific creating process that creates recognition subspaces 23 at sample points in the process that creates the recognition subspaces 23 of FIG. 7 (step S709) will then be described. FIG. 8 is a flowchart of a recognition subspace creating process that creates recognition subspaces 23 at sample points according to the first embodiment.

Ns data pairs, where Ns is a positive integer, of the images of person are selected from the N face-image data in the face-image group 10 for learning (step S801). A data pair of the images of person consists of a plurality of images of a person that are different due to differences in facial expressions, shooting angles, etc. Differences between the feature vectors at the sample points corresponding to the data pairs are then calculated (step S802) and a difference subspace of person Ss is calculated based on the differences (step S803).

No data pairs, where No is a positive integer, of the images of other person are then selected from the N face-image data in the face-image group 10 for learning (step S804). Differences of the feature vectors at the sample points corresponding to the data pairs are calculated (step S805), and a difference subspace of other person So is calculated based on the differences (step S806).

After the difference subspace of person Ss and the difference subspace of other person So are calculated, an intersection S of an auxiliary space SsC of the difference subspace of person Ss and the difference subspace of other person So, i.e.

$$s = So \cap SsC$$

is calculated, and this is regarded as a recognition subspace 23 (step S807).

Figure 9:
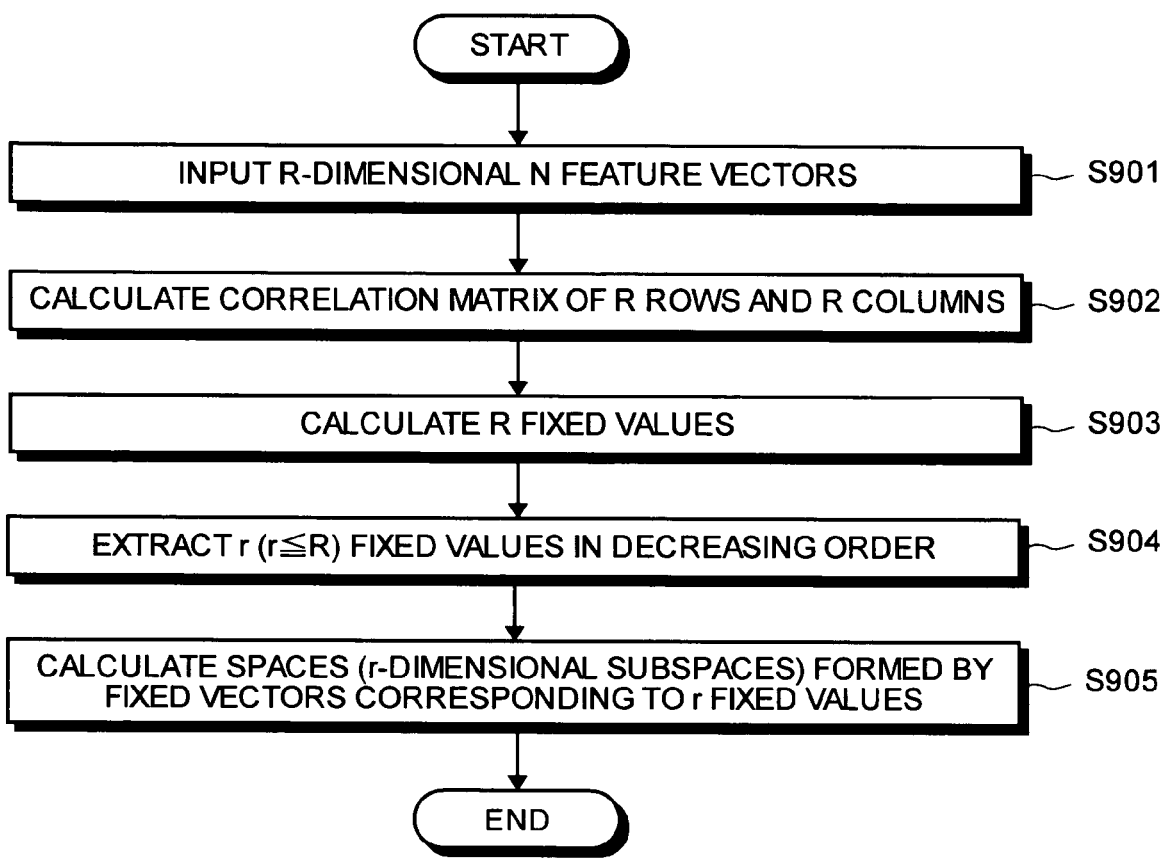
FIG. 9 is a flowchart of a subspace creating process that creates a subspace based on feature vectors according to the first embodiment.

A specific process of creating a subspace based on the feature vectors at sample points in the process that creates the difference subspace of person Ss and difference subspace of other person So of FIG. 8 (steps S803 and S806) will then be described. FIG. 9 is a flowchart of a subspace creating process that creates a subspace based on feature vectors according to the first embodiment.

R-dimensional N feature vectors Xi ($1 \leq i \leq N$) are first inputted (step S901). A correlation matrix M of R rows and R columns is calculated by using $$M(k,l) = 1/N \Sigma Xi(k) Xi(l)$$

(step S902), where $1 \leq k, l \leq R$.

When the correlation matrix M is obtained, R fixed values are calculated using the correlation matrix M (step S903), and r ($r \leq R$) fixed values are extracted in decreasing order (step S904). A space formed by fixed vectors corresponding to the r fixed values is then calculated to find an r-dimensional subspace (step S905). This is mathematically same as a statistical method called principal component analysis.

Figure 10:
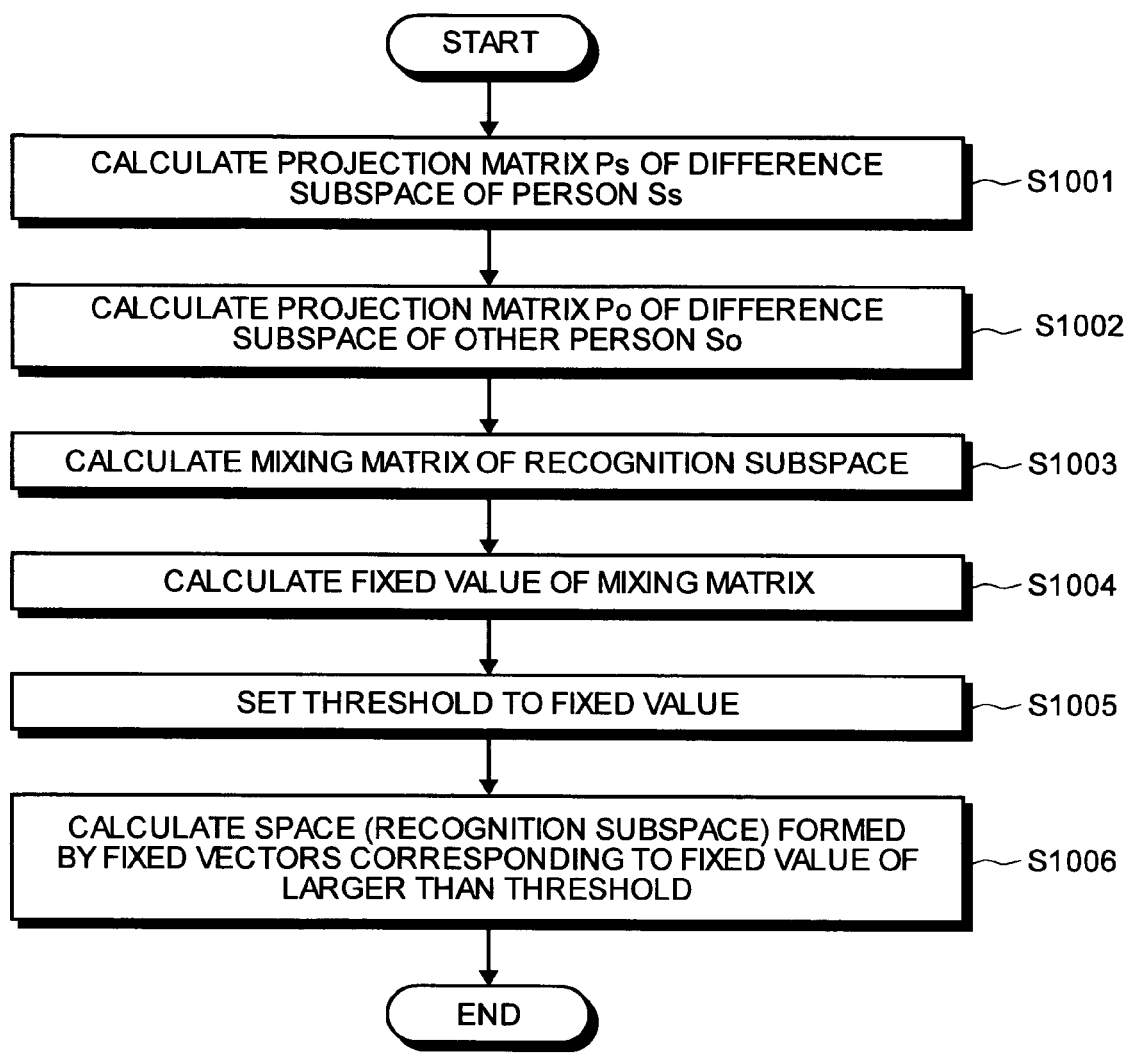
FIG. 10 is a flowchart of a recognition subspace calculating process that calculates recognition subspaces according to the first embodiment.

A specific process that calculates a recognition subspace 23 from the difference subspace of person Ss and the difference subspace of other person So in the process (step S807) that creates the recognition subspace 23 by calculating the intersection of the auxiliary space SsC of the difference subspace of person Ss and the difference subspace of other person So of FIG. 8 will then be described. FIG. 10 is a flowchart of a recognition subspace calculating process that calculates the recognition subspace 23 according to the first embodiment.

A projection matrix Ps of the difference subspace of person Ss is first calculated (step S1001), and a projection matrix Po of the difference subspace of other person So is then calculated (step S1002). A constant $\alpha$ ($0 \leq \alpha \leq 1$) is set and matrix P is calculated by using $$P = \alpha Po + (1-\alpha)(I-Ps)$$

(step S1003), where I is an identity matrix. $\alpha$ is a parameter modifying weights of the subspace of other person and a complement of the difference subspace of person and can be arbitrarily assigned. The matrix p is hereinafter referred to as a mixing matrix.

A fixed value of the mixing matrix is then calculated (step S1004) and a threshold corresponding to the fixed value is set (step S1005). The fixed value of the mixing matrix is in a range of more than 0 and less than 1, and the threshold is set close to 1 and less than 1. A fixed value larger than the threshold is extracted and a space formed by the fixed vectors corresponding to the fixed value is calculated, and the space is regarded as a recognition subspace 23 (step S1006).

Figure 11:
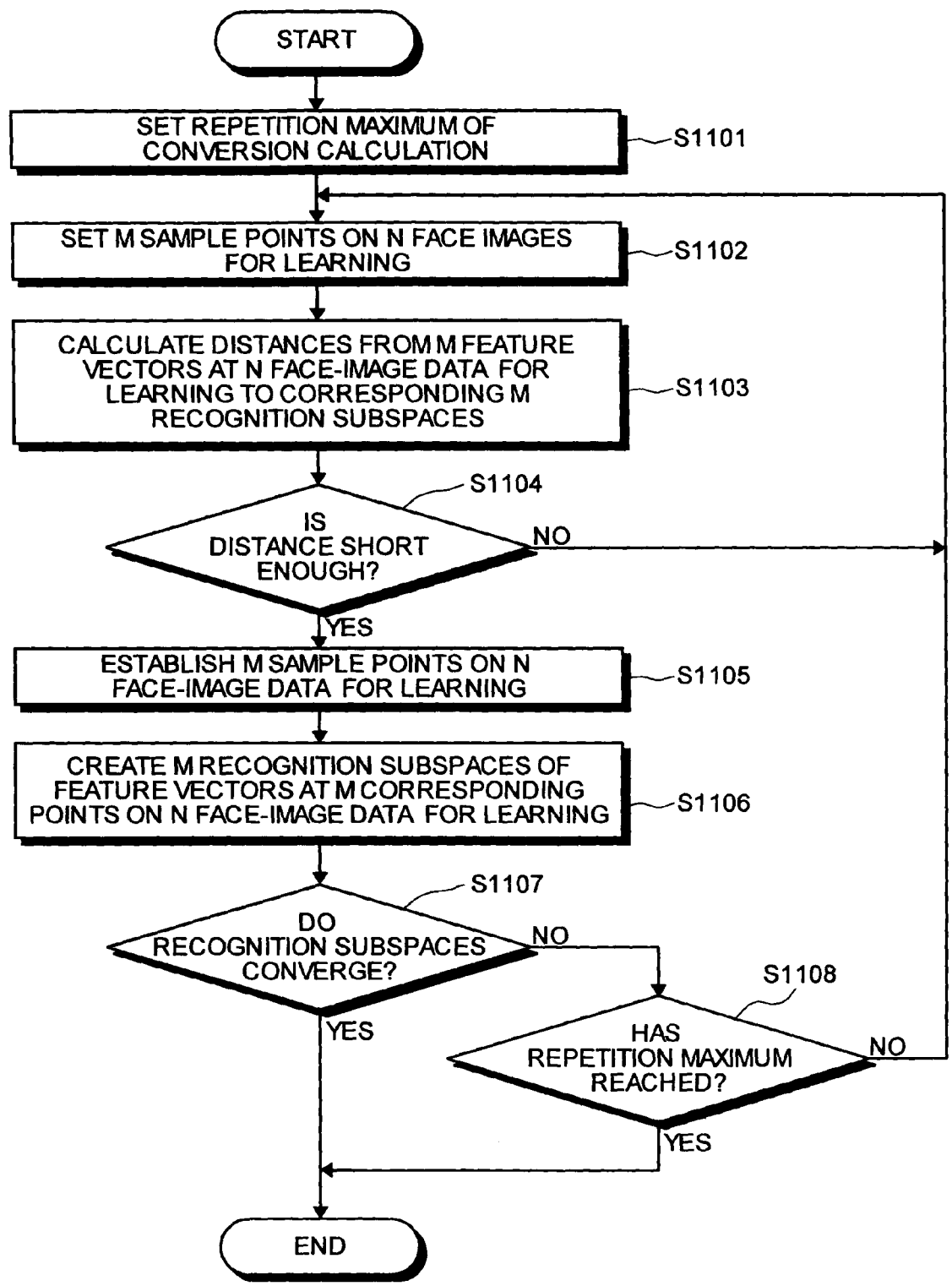
FIG. 11 is a flowchart of a recognition subspace modifying process that modifies recognition subspaces of feature vectors from the face-image group according to the first embodiment.

A specific process that learns features of faces while modifying the recognition subspaces 23 created in the process of FIG. 7 using the face-image group 10 for learning at the face-image learning unit 53 will then be described. FIG. 11 is a flowchart of a recognition subspace modifying process that modifies the recognition subspaces 23 of the feature vectors from the face-image group 10 according to the first embodiment.

The face-image learning unit 53 first sets repetition maximum of the conversion calculation of the recognition spaces 23 (step S1101) and sets M sample points corresponding to the M sample points on the average face-image 11 on the N face images in the face-image group 10 for learning (step S1102). The face-image learning unit 53 then calculates the distances from the M feature vectors at the N face images to the corresponding M recognition subspaces 23 (step S1103).

The face-image learning unit 53 then decides whether the distances to the recognition spaces 23 are shorter than a certain threshold (step S1104) and establishes sample points corresponding to the M sample points on the average face-image 11 on the N face-image data when the distances are shorter than the threshold (step S1105). The face-image learning unit 53 resets M sample points on the N face-image data when the distances are not smaller than the threshold (step S1102) and repeats the processes (steps S1102 to S1104) until the sample points have distances shorter than the threshold.

After establishing the sample points corresponding to the M sample points on the average face-image 11 on the N face-image data (step S1105), the face-image learning unit 53 creates M recognition subspaces 23 of the feature vectors at the M sample points on the N face-image data (step S1106). The face-image learning unit 53 then decides whether the recognition subspaces 23 have converged (step S1107), and when they have converged, ends the modifying process of the recognition subspaces 23 as the learning is considered to be finished.

When the recognition subspaces 23 have not converged, the face-image learning unit 53 decides whether the number of repetitions of the conversion calculation is smaller than the repetition maximum (step S1108) and ends the modifying process of the recognition subspaces 23 when the number of repetitions is not smaller, and resets the M sample points on the N face-image data when the number of repetitions is smaller (step S1102). The processes (steps S1102 to steps S1108) are repeated until the recognition subspaces 23 converge.

Figure 12:
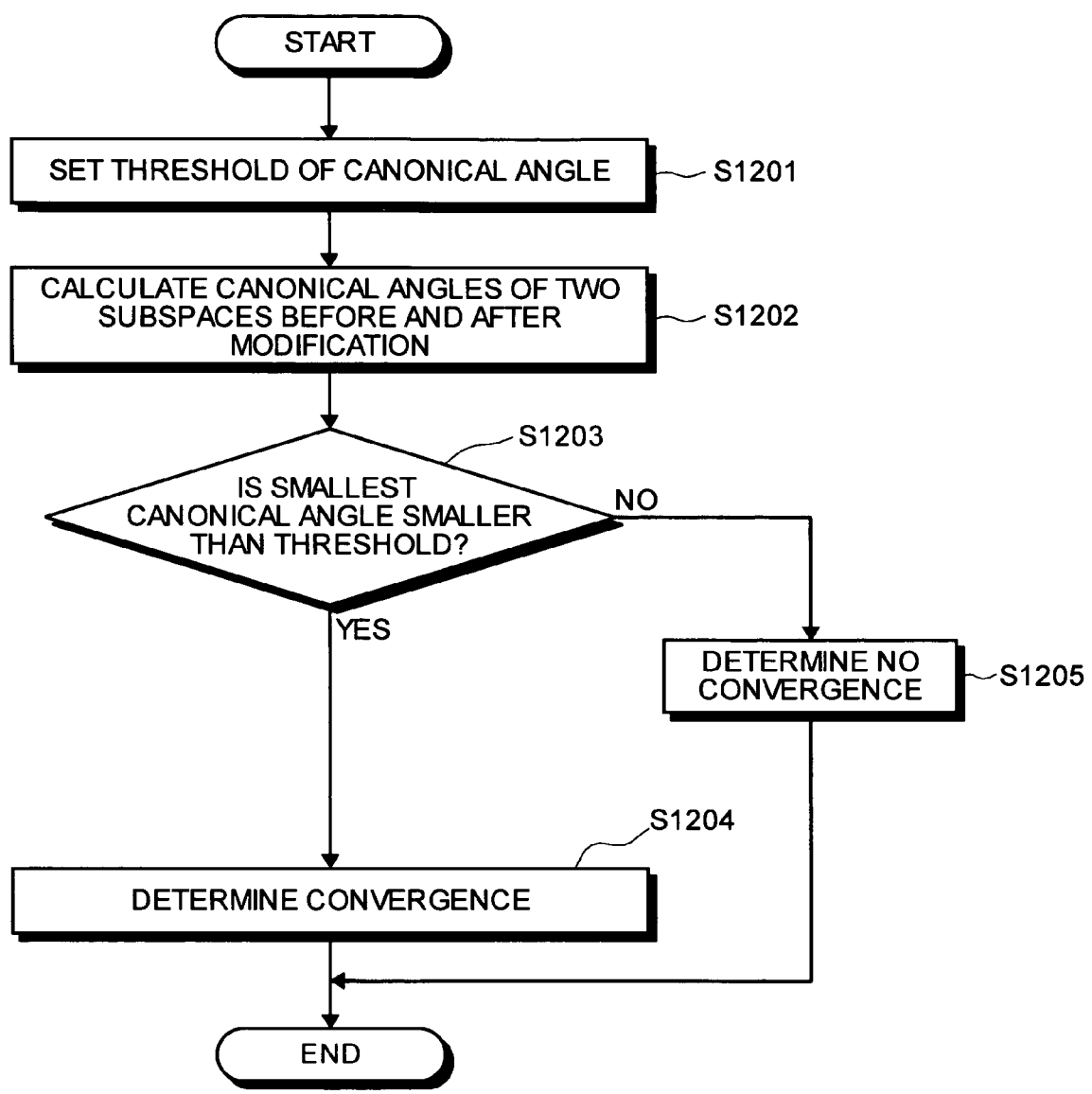
FIG. 12 is a flowchart of a recognition subspace conversion determining process that determines conversion of the recognition subspaces according to the first embodiment.

A specific procedure of the process (step S1107) of FIG. 11 that decides whether the recognition subspaces 23 have converged will then be described. FIG. 12 is a flowchart of a recognition subspace conversion determining process that determines conversions of the recognition subspaces 23 according to the first embodiment.

A threshold of a canonical angle to two recognition subspaces 23 of before and after modification is first set (step S1201), and the canonical angle is calculated (step S1202).

Whether the smallest of a plurality of canonical angles is smaller than the threshold (step S1203), and the recognition subspaces 23 are determined to have converged when the smallest canonical angle is smaller than the threshold (step S1204). The recognition subspaces 23 are determined to have not converged when the smallest canonical angle is not smaller than the threshold (step S1205).

Figure 13:
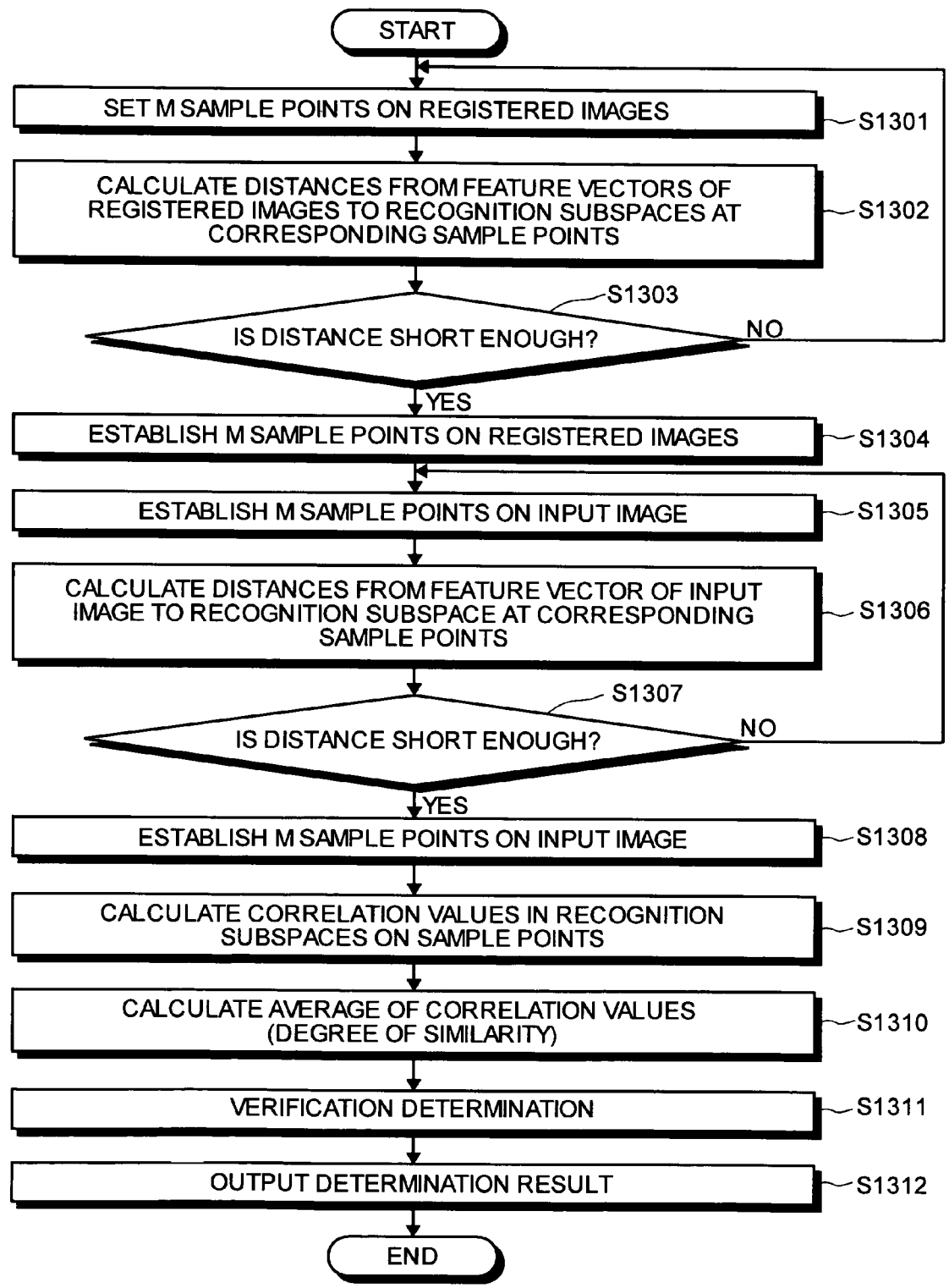
FIG. 13 is a flowchart of a procedure of a verification determination process according to the first embodiment.

A procedure of a verification determination process that verifies the registered images 14 and the input image 16 to identify a person will then be described. FIG. 13 is a flowchart of a procedure of a verification determination process according to the first embodiment.

The registered-image sample-point detecting unit 55 first reads the registered images 14 stored in the registered-image storage unit 54 and the data of the recognition subspaces 23 created by the face-image learning unit 53, and sets M sample points corresponding to the sample points on the average face-image 11 on the registered images 14 (step S1301). The registered-image sample-point detecting unit 55 then calculates the distances from the feature vectors of the registered images 14 to the recognition subspaces 23 on the corresponding sample points (step S1302). The concept of the distance is the concept already described in FIG. 3.

The registered-image sample-point detecting unit 55 then decides whether the distances to the recognition subspaces 23 are smaller than a certain threshold (step S1303) and establishes sample points corresponding to the M sample points of the average face-image 11 on the N face-image data when a distance is shorter (step S1304). The registered-image sample-point detecting unit 55 resets the M sample points on the N face-image data when a distance is not shorter (step S1301) and repeats the processes (steps 1301 to 1303) until the sample points making the distance shorter are found. The registered-image sample-point detecting unit 55 conducts the processes (steps S1301 to S1304).

The input-image sample-point detecting unit 56 then reads the input image 16 normalized by the normalization processing u nit 52 and the recognition subspace data 23 created by the face-image learning unit 53, and sets the M sample points corresponding to the sample points on the average face-image 11 on the input image 16 (step S1305). The input-image sample-point detecting unit 56 then calculates the distance from the feature vector of the input image 16 to the recognition subspace 23 on the corresponding sample points (step S1306). The concept of the distance is the concept described in FIG. 3.

The registered-image sample-point detecting unit 55 then decides whether the distances to the recognition subspaces 23 are shorter than a certain threshold (step S1307) and establishes sample points corresponding to the M sample points of the average face-image 11 on the face-image data when a distance is shorter (step S1308). When a distance is not shorter, the input-image sample-point detecting unit 56 resets the M sample points on the face-image data (step S1305) and repeats the processes (steps S1305 to S1307) until the sample points making the distance shorter are found. The input-image sample-point detecting unit 56 conducts the processes (steps S1305 to S1307).

The degree-of-similarity calculating unit 57 calculates the correlations in the recognition subspaces 23 of the feature vectors of the input image 16 and the registered images 14 at the sample points corresponding to the input image 16 and the registered images 14 (step S1309). The concept of the correlation in the recognition subspaces 23 is the concept already described in FIG. 4, and specifically, expressed by cosine of an angle θ, i.e., cos θ, formed by the feature vectors of the registered images 14 and the input image 16 projected onto the recognition spaces 23.

The degree-of-similarity calculating unit 57 then calculates the degree of similarity between the registered imaged 14 and the input image 16 by finding the average value of the correlation values at the sample points (step S1310). The verification determination unit 58 verifies and determines the registered imaged 14 and the input image 16 based on the size of the degree of similarity (step S1311) and outputs the determination result of whether the input image 16 of the person corresponds to the registered images 14 (step S1312).

Figure 14:
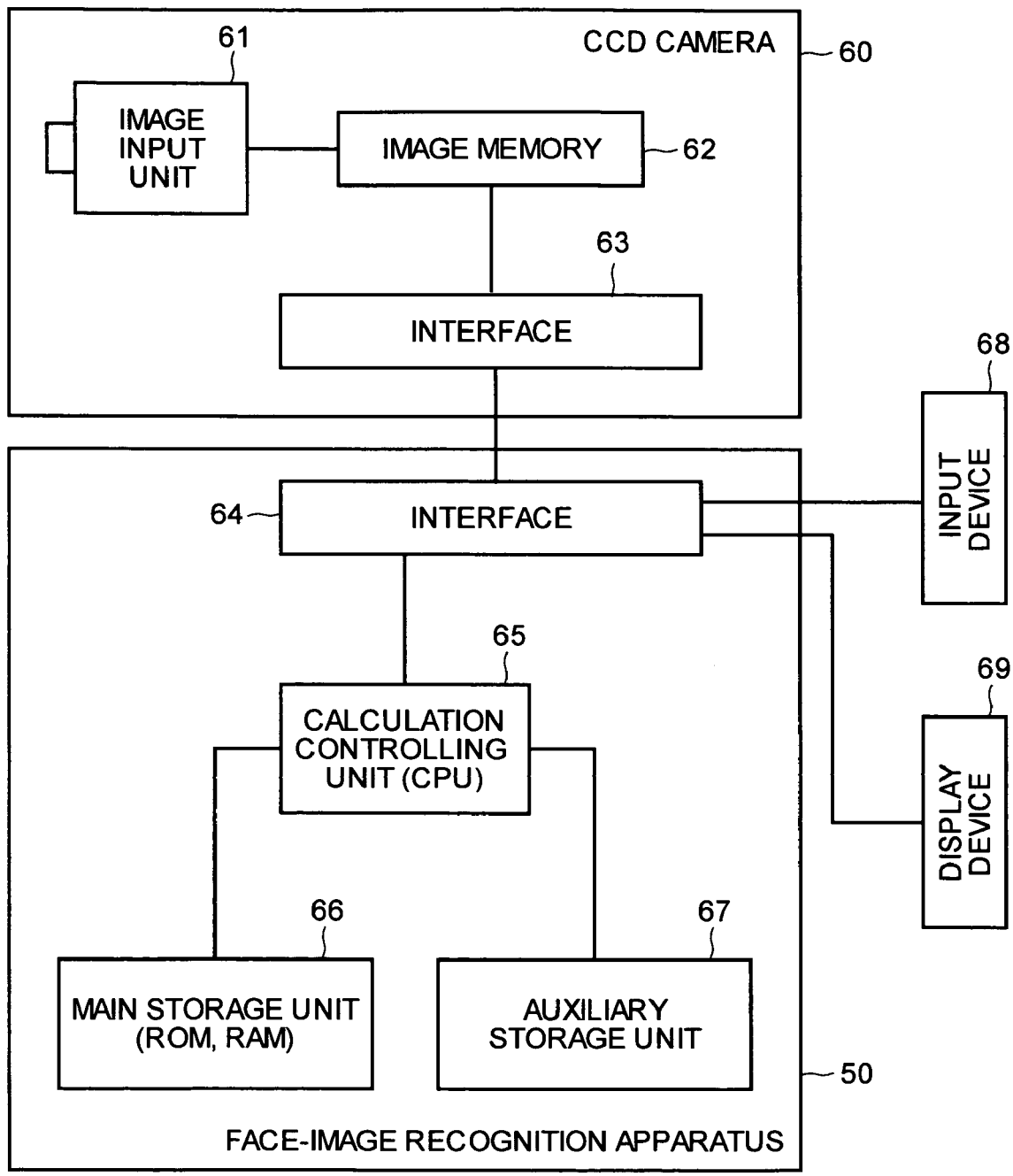
FIG. 14 is a block diagram of a system configuration of a face-image recognition apparatus according to the first embodiment.

A hardware configuration of the face-image recognition apparatus of the embodiment will then be described. FIG. 14 is a block diagram of a system configuration of the face-image recognition apparatus according to the first embodiment.

As shown in FIG. 14, the face-image recognition apparatus 50 includes an interface 64, a calculation controlling unit 65, a main storage unit 66, and an auxiliary storage unit 67, and an input device 68 and a display device 69 are connected to the face-image recognition apparatus 50. The face-image recognition apparatus 50 has a standalone configuration using a computer.

A CCD camera 60 that captures an input image is connected to the face-image recognition apparatus 50 through the interface 64. The CCD camera 60 consists of an image input unit 61, an image memory 62, and an interface 63.

A configuration of the CCD camera 60 will be specifically described first. The image input unit 61 focuses lights with lenses from a face that is a subject and converts the face image to an electric signal using the CCD (Charge Coupled Device). The image input unit 61 then converts the signal to digital data and records the face-image data to the image memory 62.

The image memory 62 is used as a buffer memory of the image input unit 61 and temporarily stores face-image data when the face-image recognition apparatus 50 cannot accept input of the face image. When the face-image recognition apparatus 50 comes to be able to accept the input data, the face-image data is outputted to the face-image recognition apparatus 50 through the interface 63.

A configuration of the face-image recognition apparatus 50 will then be described specifically. Under control of the calculation controlling unit 65, the interface 64 accepts an input image from the CCD camera 60. The interface 64 also accepts data from the input device 68 and transfers data to the display device 69.

The input device 68 is configured by a keyboard, a mouse, a touch panel, etc. During the execution of the face image recognition program, the input device 68 is used when specifying the places of eyes, noses, and mouths of the face images (step S603), when specifying the sample points on the created average face (step S704), etc.

The display device 69 is a display monitor, and during the execution of the face image recognition program, the display device 69 is used to display the sample points on the average face-image 11, the sample points on the registered image 14, sample points of the input image 16, verification determination result (step S1312), etc.

The auxiliary storage unit 67 is, for example, a CD drive that can read data from a Floppy (registered trademark) disk drive (FDD), a hard disk drive (HDD), a CDROM, a CD-R, a CD-RW, etc., or a DVD drive that can read data from a DVD-ROM, a DVD-R, a DVD-RW, a DVD-RAM, etc.

The face image recognition program executed by the face-image recognition apparatus 50 of the embodiment is provided by recording the program in a file executable by an FD, a CD-ROM, a DVD-ROM, etc. A Floppy (registered trademark) disk drive, a CD drive, a DVD drive, etc., read and execute the program.

The face-image data in the face-image group 10 for learning and the face-image data for registration are also provided by an FD, a CD-ROM, a DVD-ROM, etc., and a Floppy (registered trademark) disk drive, a CD drive, or a DVD drive reads the data. The face-image learning unit 53 stores and processes the face-image data for learning, and the registered-image storage unit 54 stores the face-image data for registration. The auxiliary storage unit 67 configures a storage unit of the present invention.

The auxiliary storage unit 67 does not have to be directly connected to the face-image recognition apparatus 50, and the auxiliary storage unit 67 can be configured to exist in the network. For example, the configuration may be such that a face-image server is provided on the Internet or LAN to store the face-image data for learning and the face-image data for registration, and the data can be downloaded as necessary. In this case, a communicating unit such as a modem or a LAN board needs to be additionally set in the face-image recognition apparatus 50.

The face-image recognition apparatus 50 of the embodiment provides a calculation controlling unit 65 such as a CPU that controls the entire system and a main storage unit 66 including storage media such as a RAM and a ROM. The ROM stores in advance a boot program, etc., and the RAM stores a part of an OS (Operation System) read from an HD, a face image recognition program, etc. The calculation controlling unit 65 executes the programs. The RAM further stores various face-image data read during execution of the face image recognition program, sample point data, calculation result, etc.

As described, in the first embodiment, the average face-image 11 for specifying the sample points is created from the face-image group 10, and the sample points on the face images in the face-image group 10 corresponding to the sample points on the average face-image 11 are detected to create recognition subspaces 23 of the feature vectors. The sample points on the registered images 14 and the input image 16 corresponding to the average face-image 11 are detected using the recognition subspaces 23, and the degree of similarity of the feature vectors in the recognition subspaces 23 of the registered images 14 and the input image 16 is calculated at the detected sample points to verify and determine the registered images 14 and the input image 16. Since the image recognition apparatus is configured this way, the image recognition apparatus can efficiently set the sample points for comparing the features of the registered images 14 and the input image 16, and can conduct the identification process of person in a short time.

Although the first embodiment illustrated a case that the image to be recognized by the image recognition apparatus being a face image, the present invention is not limited to the case and can be applied to a predetermined part of body that includes some kind of features. For instance, in an example of palm, lines of the palm can be used as a feature corresponding to the eyes, nose, and mouth in the case of the face.

In the case of the face image, although positions of the eyes, nose, and mouth are specified when creating the average face-image 11 (step S603), in the case of the palm image, positions of the lines of the palm shall be specified instead. Amount of features such as direction of the ridges of the palm print, curvature, etc., may also be used as a feature vector. Since the other processes are similar to the processes of the face image, a palm print image recognition apparatus can easily be realized.

Second Embodiment

Although the degree of similarity between the registered images 14 and the input image 16 is calculated by finding correlation of the feature vectors made of real number elements in the first embodiment, feature vectors made of approximate values binarizing the real number elements of the feature vectors may be created, coincidence of the feature vectors made of approximate values of the registered images 14 and the input image 16 may be calculated to extract a registered image 14 similar to the input image 16, and the thorough verification process of the input image 16 using the extracted registered images 14 may be conducted.

Narrowing down the registered images 14 similar to the input image 16 at the beginning with simplified calculation and conducting the thorough verification process between the narrowed down registered images 14 and the input image 16 enable high-speed execution of verification process of the registered images 14 and the input image 16 even when a number of the registered images 14 comparing to the input image 16 or a number of the sample points on the registered images 14 and the input image 16 are very large. In a second embodiment, a case of extracting registered images 14 that the thorough verification process is conducted with the input image 16 using binarized feature vectors will be described.

Figure 15:
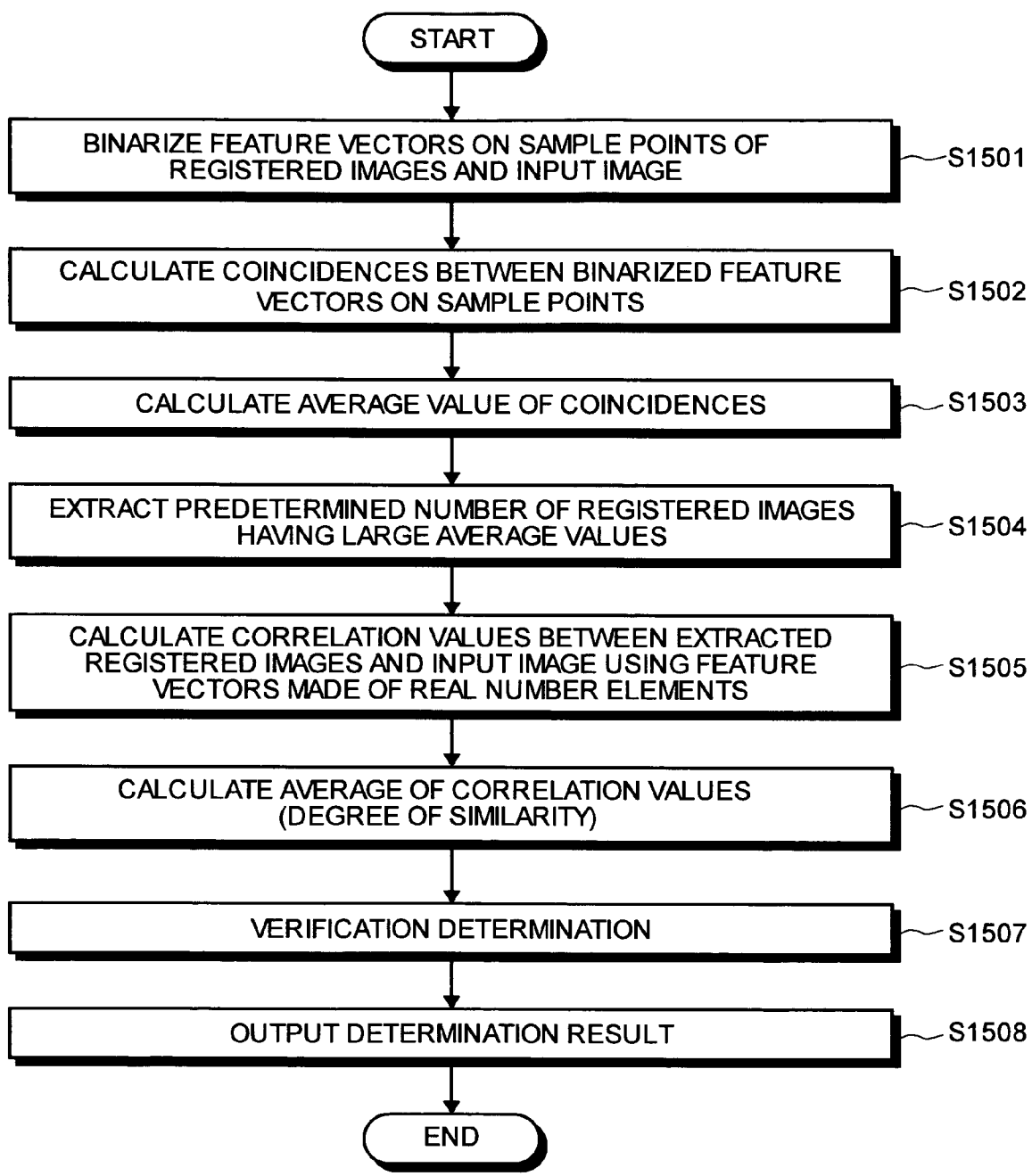
FIG. 15 is a flowchart of a procedure of a verification determination process according to a second embodiment.

FIG. 15 is a flowchart of a procedure of the verification determination process according to the second embodiment. Since the procedure of detecting the sample points on the registered images 14 and the input image 16 is same as the procedure of steps S1301 to S1308, the procedure will not be described.

A functional configuration of a face-image recognition apparatus of the second embodiment is approximately the same as the functional configuration of the face-image recognition apparatus of FIG. 5. However, a degree-of-similarity calculating unit of the second embodiment binarizes feature vectors of the registered images 14 and the input image 16 made of real number elements and further conducts a process of calculating coincidences between the registered images 14 and the input image 16 using the binarized feature vectors. This process will be described in detail with reference to FIG. 15.

The degree-of-similarity calculating unit of the second embodiment first binarizes feature vectors projected to the recognition subspaces 23 on the sample points of the registered images 14 and the input image 16 (step S1501) and calculates the coincidences between the feature vectors binarized on the sample points (step S1502).

Specifically, when a sign of the real number element configuring a feature vector is positive, the degree-of-similarity calculating unit converts the element to "1", and when a sign of the real number element is negative, the degree-of-similarity calculating unit converts the element to "0". The similarity calculating unit then determines whether the values binarized between the elements corresponding to the feature vectors of the registered images 14 and the feature vectors of the input image 16 coincide, and conducts a process of setting the number of coincided elements as a coincidence. The degree-of-similarity calculating unit stores the original real number elements when converting the real number elements to the binary elements.

For every pair of the registered images 14 and the input image 16, the degree-of-similarity calculating unit calculates an average value averaging the coincidence of the feature vectors corresponding to the sample points (step S1503) and extracts a predetermined number of registered images 14 having average values larger than the predetermined threshold (step S1504).

The degree-of-similarity calculating unit then calculates correlation values in the recognition subspaces 23 on the sample points between the extracted registered images 14 and input image 16 using the feature vectors made of the stored real number elements (step S1505) and calculates a degree of similarity between the registered images 14 and the input image 16 by finding an average number of the correlation values at the sample points (step S1506).

The verification determination unit 58 then verifies and determines the registered images 14 and the input image 16 based on the size of the degree of similarity (step S1507) and outputs determination result of whether the person of the registered image 14 is the same person as the person of the input image 16 (step S1508).

As described, in the second embodiment, registered images 14 similar to the input image 16 are extracted by using the real number elements of the feature vectors at the sample points on the detected input image 16 and the feature vectors binarizing the real number elements of the feature vectors at the sample points on the registered images 14 to "1" or "0". The degree of similarity is then calculated based on the correlations of the feature vectors made of real number elements of the extracted registered images 14 and input image 16 to verify the input image 16 and the registered images 14 and to identify the person. Therefore, faster identification process of person can be conducted while maintaining the verification accuracy by narrowing down the registered images 14 to be verified with the input image 16 and by conducting a thorough verification process between the narrowed down registered images 14 and the input image 16.

Although a case of binarizing the real number elements of the feature vectors is indicated in the second invention, the present invention is not limited to the case.

Registered images 14 similar to the input image 16 may be extracted using feature vectors made of approximate values that the real number elements are ternarized or quarternarized, or registered images 14 similar to the input image 16 may be extracted by using feature vectors made of approximate values that the real number elements are converted to integer elements.

INDUSTRIAL APPLICABILITY

As described hereinabove, the image recognition apparatus, the image recognition method, and the program causing the computer to execute the method efficiently set sample points for comparing features of the images and are useful for an image recognition system necessary to execute the recognition process of person in a short time.

The invention claimed is:

1. An image recognition apparatus that compares a local feature at least one sample point in an input image of a body part of a person and a plurality of local features registered in advance to verify the person, the apparatus comprising:
    an average-image creating unit that creates an average image from a plurality of images in an image group related to the body part;
    a subspace creating unit that detects sample points on the images in the image group corresponding to sample points set on the average image to create subspaces of feature vectors at the sample points set on the images in the image group;
    a sample point detecting unit that detects sample points in the input image and registered images based on the subspaces, wherein the sample point detecting unit detects the sample points in the input image and the registered images corresponding to the sample points on the average image based on distance from a feature vector of the input image to the subspace and distances from the feature vectors of the registered images to the subspaces respectively; and
    a verification determination unit that calculates a degree of similarity between feature vectors at the sample points on the input image and those on the registered images and that verifies the person based on the degree of similarity.

2. The image recognition apparatus according to claim 1, wherein the subspace creating unit comprises:
    a first detecting unit that detects sample points on images in the image group corresponding to the sample points set on the average image using correlations between the feature vectors of the images in the image group and the feature vector of the average image;
    a provisional-subspace creating unit that creates provisional subspaces of feature vectors using the feature vectors at the sample points on the images in the image group detected by the first detecting unit;
    a second detecting unit that detects sample points on images in the image group corresponding to the sample points set on the average image based on the distances from feature vectors of the image in the image group to the subspaces; and
    a subspace modifying unit that modifies the subspaces created by the provisional-subspace creating unit using the feature vectors at the sample points on the images in the image group detected by the second detecting unit.

3. The image recognition apparatus according to claim 2, wherein
    the provisional-subspace creating unit comprises:
    a first calculating unit that prepares image pairs of the person from the image group to calculate difference subspaces of the same person by finding differences between feature vectors at the sample points of the image pairs detected by the first detecting unit corresponding to the sample points set on the average image;
    a second calculating unit that prepares image pairs of an other person from the image group to calculate difference subspaces of the other person by finding differences between the feature vectors at the sample points of the image pairs detected by the first detecting unit corresponding to the sample points set on the average image; and
    a third calculating unit that calculates intersections of auxiliary spaces of the difference subspaces calculated by the first calculating unit and the difference subspaces calculated by the second calculating unit and that regards the intersections as subspaces.

4. The image recognition apparatus according to claim 2, wherein the subspace modifying unit comprises:
    a first calculating unit that prepares image pairs of the person from the image group to calculate difference subspaces of the same person by finding differences between feature vectors at the sample points of the image pairs detected by the second detecting unit corresponding to the sample points set on the average image;
    a second calculating unit that prepares image pairs of an other person from the image group to calculate difference subspaces of the other person by finding differences between the feature vectors at the sample points of the image pairs detected by the second detecting unit corresponding to the sample points set on the average image;

a third calculating unit that calculates intersections of auxiliary spaces of the difference subspaces calculated by the first calculating unit and the difference subspaces calculated by the second calculating unit and that regards the intersections as subspaces; and an updating unit that updates the subspaces by repeatedly using the second detecting unit, the first calculating unit, the second calculating unit, and the third calculating unit until the subspaces created by the third calculating unit converge.

5. The image recognition apparatus according to claim 1, wherein the verification determination unit calculates the degree of similarity based on the correlations in the subspaces of the feature vectors at the sample points on the input image and those on the registered images.

6. The image recognition apparatus according to claim 1, wherein the verification determination unit extracts registered images similar to the input image based on the feature vectors generated by transforming elements of the feature vectors at the sample points on the input image and those on the registered images to approximate values and calculates the degree of similarity based on the correlations in the subspaces of the feature vectors made of the elements before transformation at the sample points corresponding to the extracted registered images and the input image.

7. An image recognition method that compares a local feature at least one sample point in an input image of a body part of a person and a plurality of local features registered in advance to verify the person, the image recognition method comprising:

creating an average image from a plurality of images in an image group relating to the body part;

detecting sample points on the images in the image group corresponding to the sample points set on the average image to create subspaces of feature vectors of the sample points set on the images in the image group;

detecting sample points in the input image and registered images corresponding to the sample points on the average image based on distance from the feature vector of the input image to the subspace and distances from the feature vectors of the registered images to the subspaces respectively; and calculating, using a computer, a degree of similarity between the feature vectors at the sample points on the input image and on the registered images and verifying the person based on the degree of similarity.

8. A computer-readable recording medium that stores therein a computer program that causes a computer to compare a local feature at least one sample point in an input image of a body part of a person and a plurality of local features registered in advance to verify the person, the computer program causing the computer to execute:

creating an average image from a plurality of images in an image group relating to the body part;

detecting sample points on the images in the image group corresponding to the sample points set on the average image to create subspaces of feature vectors of the sample points set on the images in the image group;

detecting sample points in the input image and registered images corresponding to the sample points on the average image based on distance from the feature vector of the input image to the subspace and distances from the feature vectors of the registered images to the subspaces respectively; and calculating a degree of similarity between the feature vectors at the sample points on the input image and on the registered images and verifying the person based on the degree of similarity.

* * * * *